(12) United States Patent
Smith

(10) Patent No.: US 6,550,154 B1
(45) Date of Patent: Apr. 22, 2003

(54) LEVEL ADJUSTING APPARATUS FOR A POWER TOOL

(75) Inventor: Darrin Eugene Smith, Ontario (CA)

(73) Assignee: Jessem Products Ltd., Barrie (CA)

( * ) Notice: Subject to any disclaimer, the term of this patent is extended or adjusted under 35 U.S.C. 154(b) by 0 days.

(21) Appl. No.: 09/627,241

(22) Filed: Jul. 27, 2000

(30) Foreign Application Priority Data

Jul. 27, 1999 (CA) .............................................. 2278869

(51) Int. Cl.$^7$ ............................. B23B 49/00; B27C 5/02; B27C 5/04; B23C 1/00
(52) U.S. Cl. ....................... 33/638; 33/642; 144/136.95; 144/154.5; 409/182
(58) Field of Search ........................... 33/638, 613, 626, 33/628, 642, 1 PT, 1 N; 144/136.95, 154.5; 409/182

(56) References Cited

U.S. PATENT DOCUMENTS

| 1,668,061 A | | 5/1928 | Falkins |
| 2,038,810 A | | 4/1936 | Tautz |
| 3,345,893 A | * | 10/1967 | Holdridge .................... 33/628 |
| 3,368,596 A | | 2/1968 | Comer |
| 3,386,482 A | | 6/1968 | Nadeau |
| 3,465,793 A | | 9/1969 | Zuk |
| 4,077,161 A | | 3/1978 | Wyle et al. |
| 4,249,442 A | | 2/1981 | Fittery |
| 4,281,694 A | * | 8/1981 | Gorman .................. 144/134 D |
| 4,484,608 A | * | 11/1984 | Ferdinand et al. ...... 144/134 B |
| 4,597,185 A | * | 7/1986 | Ury ............................. 33/185 R |
| 4,599,927 A | | 7/1986 | Eccardt et al. |
| 4,660,288 A | * | 4/1987 | Dangschat .................... 33/1 L |
| 4,679,606 A | * | 7/1987 | Bassett .................... 144/134 A |
| 4,738,571 A | * | 4/1988 | Olson et al. ................ 409/137 |
| 5,042,542 A | * | 8/1991 | Purviance ............... 144/134 A |
| 5,052,119 A | * | 10/1991 | Eventoff ..................... 33/569 |
| 5,139,061 A | | 8/1992 | Neilson |
| 5,304,004 A | * | 4/1994 | Nunes ........................ 374/208 |
| 5,429,162 A | * | 7/1995 | Bonnett .................. 144/251 A |
| 6,009,782 A | | 1/2000 | Tajima et al. |
| 6,374,878 B1 | * | 4/2002 | Masley et al. ............. 144/48.6 |

FOREIGN PATENT DOCUMENTS

FR 582743 12/1924

* cited by examiner

Primary Examiner—Diego Gutierrez
Assistant Examiner—Gail Verbitsky
(74) Attorney, Agent, or Firm—Birch, Stewart, Kolasch & Birch, LLP (57) ABSTRACT

The level-adjusting apparatus adjusts the level of a tool such as a router having a bit for cutting a piece of work on a working surface. The apparatus has a carriage on which the router is mounted. The carriage is located beneath the working surface and its bit projects above the surface. The carriage may be raised and lowered by means of a handle above the working surface. The handle is removable so that once the router is in position the handle may be removed so that it does not interfere with the routing operation.

57 Claims, 8 Drawing Sheets

LEVEL ADJUSTING APPARATUS FOR A POWER TOOL

BACKGROUND OF THE INVENTION

This invention relates to an apparatus for selectively raising and lowering a power tool. More particularly the invention relates to an apparatus for adjusting the level of an electrical tool located beneath a work bench.

Power tools such as saws and routers are commonly mounted beneath the top or working surface of a work bench. The blade of the saw or the bit of the router projects through an opening in the working surface and cuts the work piece which rests on the working surface.

The depth of cut is adjusted by raising or lowering the saw or router. The mechanism for making the adjustment is conventionally attached to the saw or router so that the operator of the machine must crouch down to make the adjustment. Usually the operator must repeatedly do so in order to adjust the depth accurately. For example, he will check the depth from above the table, crouch down to adjust the tool, then stand up to check the depth again and so on. He can spend a considerable amount of time and energy in doing so.

SUMMARY OF THE INVENTION

It has been found that the level of a power tool such as a saw or router can be adjusted by means of an apparatus which is beneath a table top for protection from saw dust, wood chips, nails and the like but which is manipulated by means of a handle which fits into an aperture on the table top. The operator can manipulate the handle from above the table; he need not stoop down or otherwise change his position while he is making the adjustment.

After the adjustment is made, the operator can remove the handle so that it does not hinder the sawing or routing operation. Any debris which falls into the aperture from which the handle was removed falls harmlessly to the ground and not onto the apparatus for making the adjustment.

Broadly, the level-adjusting apparatus of the invention serves to adjust the level of a tool having an implement for cutting a piece of work. The apparatus includes: a working surface on which a piece of work to be cut is placed and a carriage beneath the working surface for supporting the tool such that its cutting implement projects above the working surface. A tube extends downwardly from the working surface and has an inner wall which defines a longitudinally extending space. A rotary element in the form of a tube is open at its top such that its space communicates with an aperture formed in the working surface and is open at its bottom such that particulate material which falls into the aperture falls downwardly through the space and exits through the open bottom of the tube. A spindle is operatively connected to the carriage such that rotation of the spindle causes a change in elevation of the carriage. The spindle is spaced from the tube sufficiently such that the particulate material which discharges from the tube does not fall on the spindle. There is means for operatively interconnecting the tube with the spindle such that rotation of the tube causes a like rotation of the spindle. A handle has a stem which is removably received in the aperture and in the space of the tube and when therein, contacts the inner wall of the tube such that rotation of the handle causes a like rotation of the tube and a like rotation of the spindle with resulting raising or lowering of the carriage.

DESCRIPTION OF THE DRAWINGS

The level-adjusting apparatus of the invention is described with reference to the accompanying drawings in which.

Like reference characters refer to like parts throughout the description of the drawings.

DESCRIPTION OF THE PREFERRED EMBODIMENTS

Figure 1:
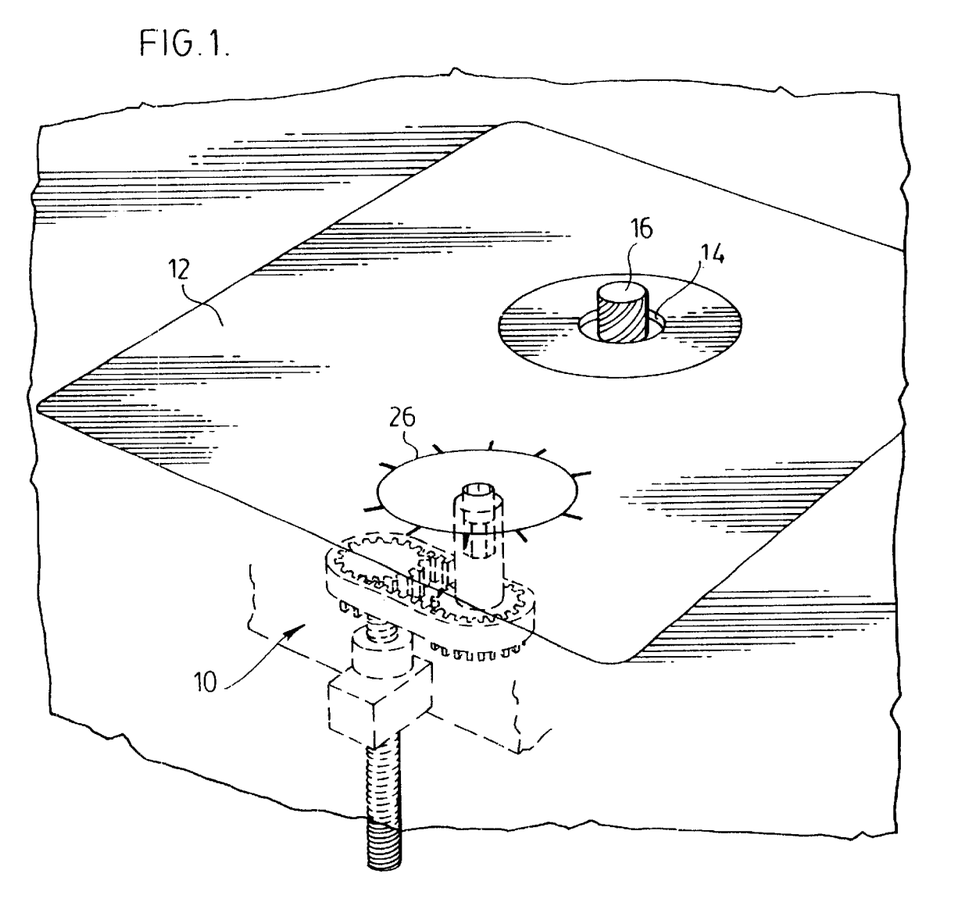
FIG. 1 is a perspective view of the upper portion of the apparatus, in conjunction with a router.
Figure 2:
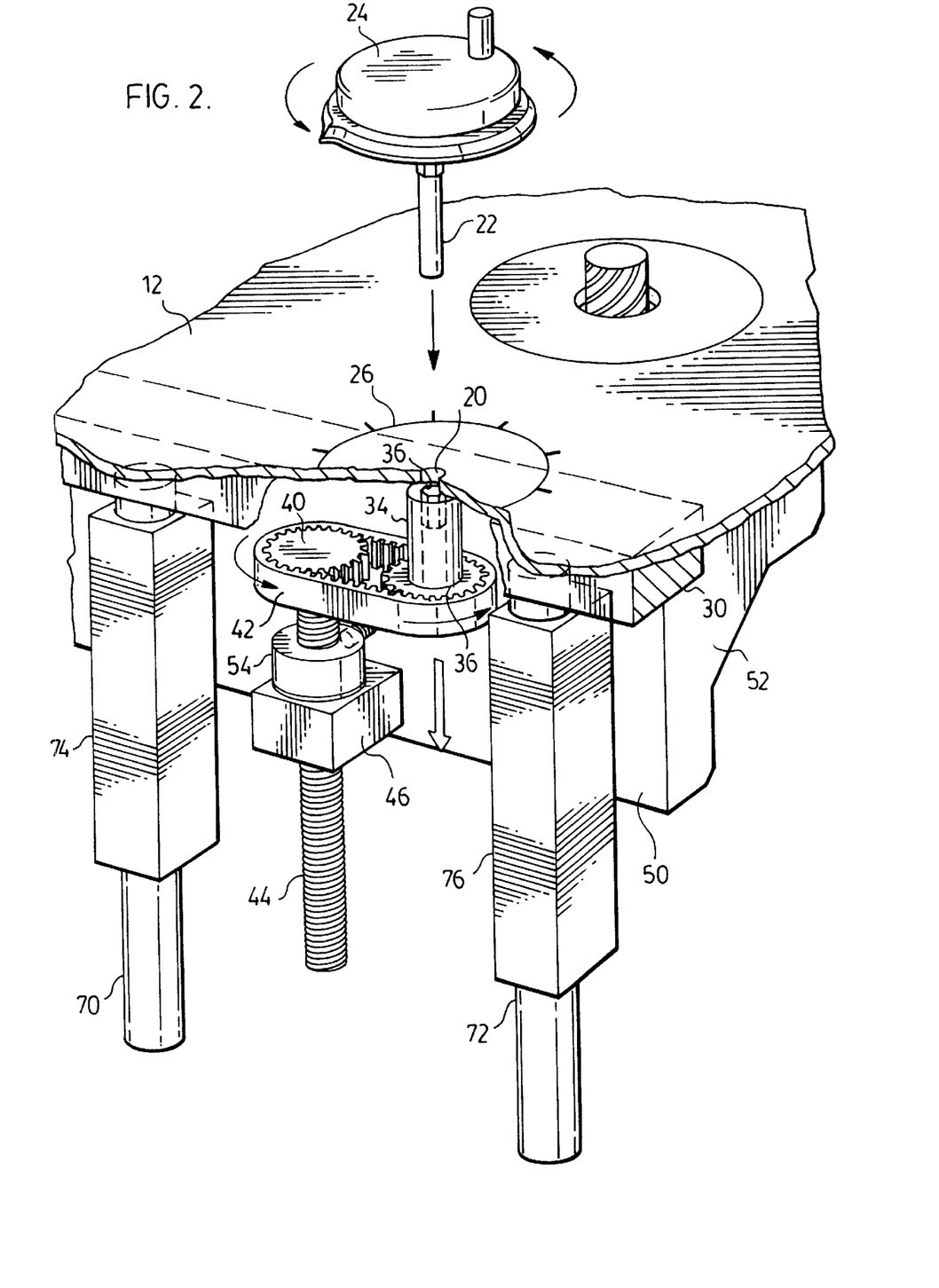
FIG. 2 is perspective view of the means for altering the level of the carriage on which a router is mounted, partly cut away, in conjunction with the bit of the router.

With reference to FIGS. 1 and 2, the apparatus of the invention, generally 10, includes a plate or working surface 12 on which a piece of work (not illustrated) is placed. The plate has an aperture 14 through which the bit 16 of a router 18 (FIGS. 4 and 5) extends. As is well known, the bit constitutes the cutting implement of the tool and serves to form the grooves, patterns and the like in a work piece.

The plate has a second aperture 20 through which the stem 22 of a handle 24 extends and that aperture is surrounded by a circular scale 26 etched or painted onto the upper surface of the plate.

Figure 3:
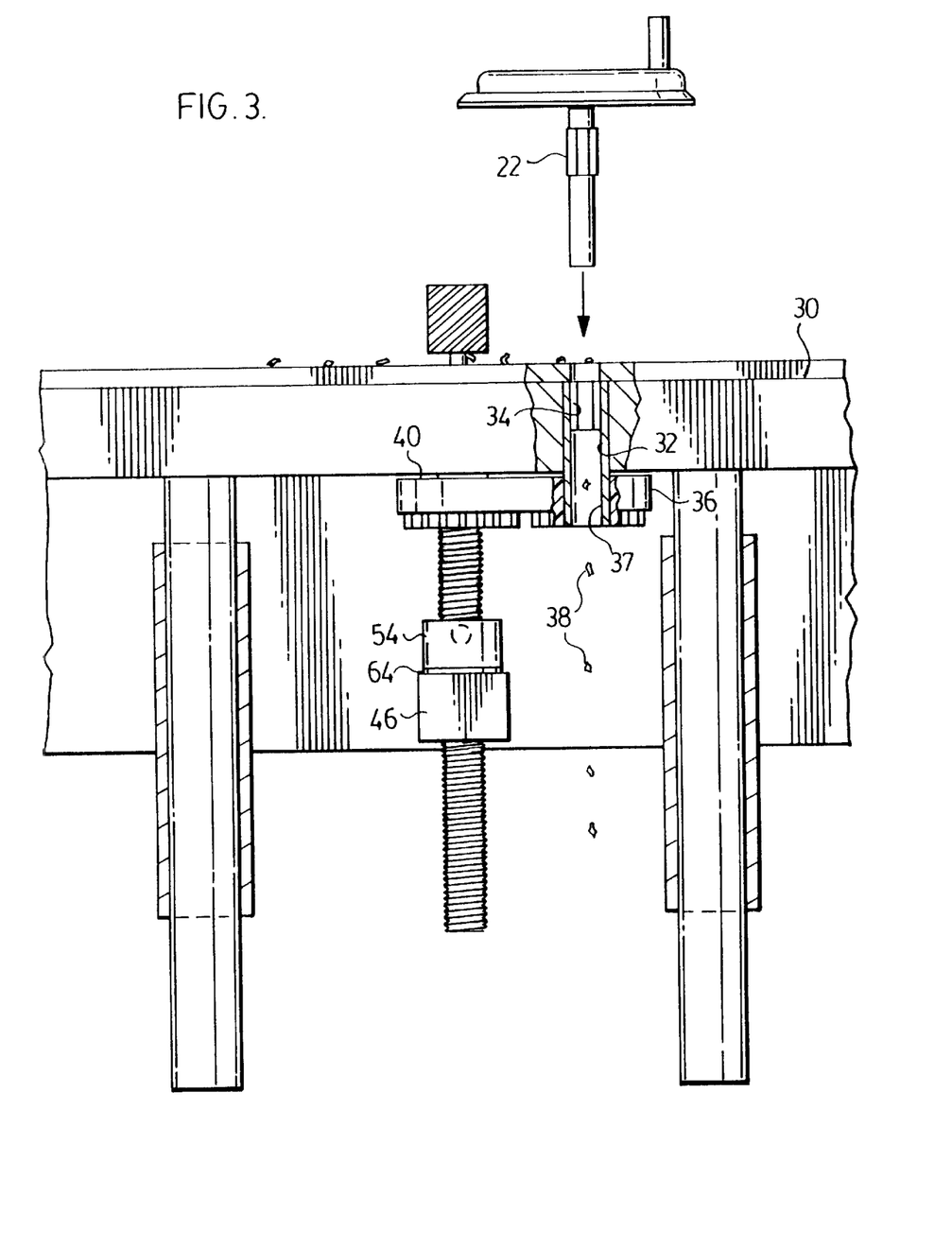
FIG. 3 is an elevation of the apparatus illustrated in FIG. 2.

With reference to FIGS. 2 and 3, a bar 30 is attached to the lower wall of the plate. A cylindrical opening 32 is formed in the bar and extends downwardly from aperture 20 and terminates at the lower wall of the bar.

A rotary element or tube 34 is received in the opening and is free to rotate therein. A gear wheel 36 is keyed to the lower portion of the outer wall of the tube. The tube forms the hub of the gear wheel. The tube has a hollow longitudinally extending central space or opening defined by a hexagonal inner wall 37. The tube is open at the bottom and the top.

Stem 22 of the handle has a hexagonal outer wall which conforms in shape to that of the inner wall of the tube so that when the stem is inserted through aperture 20 and into the tube, the stem locks to the tube. As a result, when the stem rotate so too does the tube. Thus rotation of handle 24 causes a like rotation of gear wheel 36. There is however play between the stem and the tube so that the stem can be freely inserted and withdrawn from the tube.

As illustrated in FIG. 3, when the stem is not in the tube, the space beneath aperture 20 is clear of obstruction. The central opening of the tube is directly beneath the aperture so that any saw dust which falls into the aperture will fall through the opening and to the floor as at 38. Since the tube forms the hub of gear wheel 36, the saw dust will not interfere with the operation of the gear wheel.

A second gear wheel 40 is spaced horizontally from gear wheel 36. The two wheels are interconnected by a belt 42 having teeth on its inner wall which mate with the teeth of the two gear wheels. The second or driven gear wheel 40 is affixed or splined to a threaded spindle 44. The spindle is threadably received in a block 46 which is affixed to the vertical wall 50 of a carriage 52 for the router.

The two gear wheels 36, 40 serve as the means for operatively interconnecting the tube 34 to the spindle 44. The spindle, it will be noted, is spaced from tube 34 sufficiently that saw dust and other small particulate material which fall from the tube do not fall onto the spindle and hence do not interfere with its operation.

Figure 4:
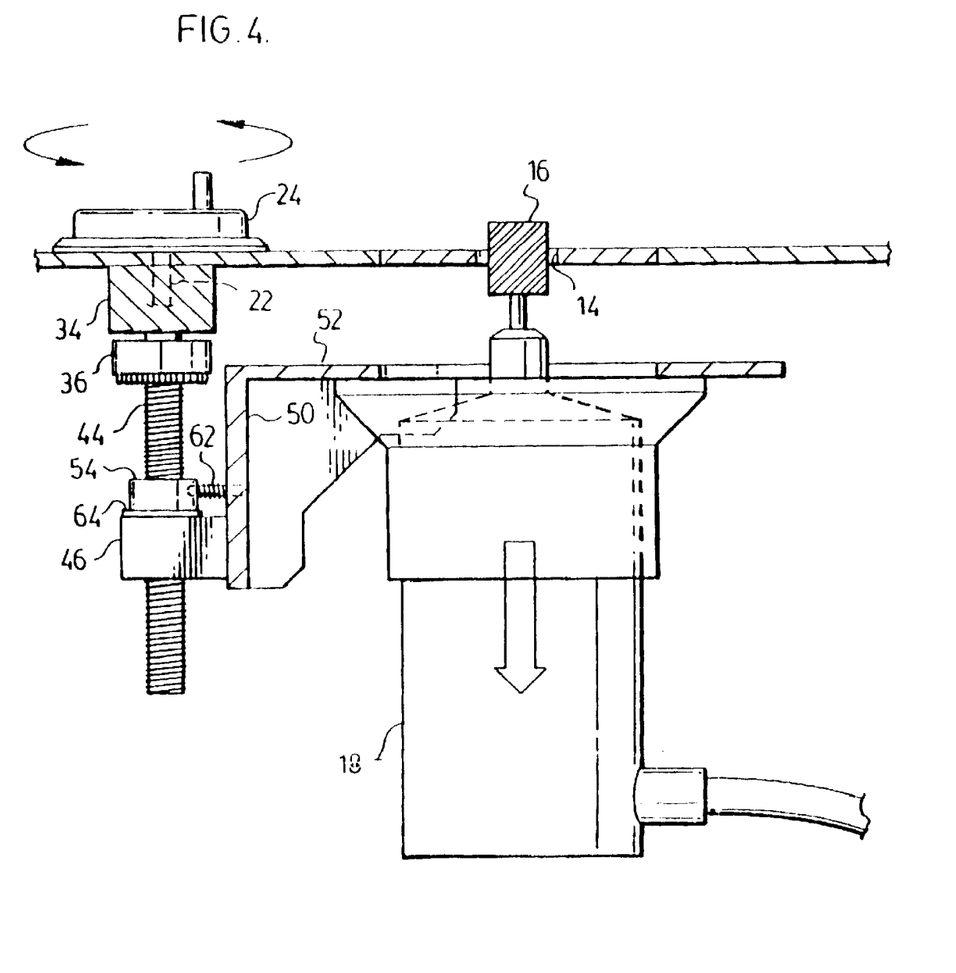
FIG. 4 is an elevation of the apparatus showing the manner in which it lowers a router.
Figures 5, 6:
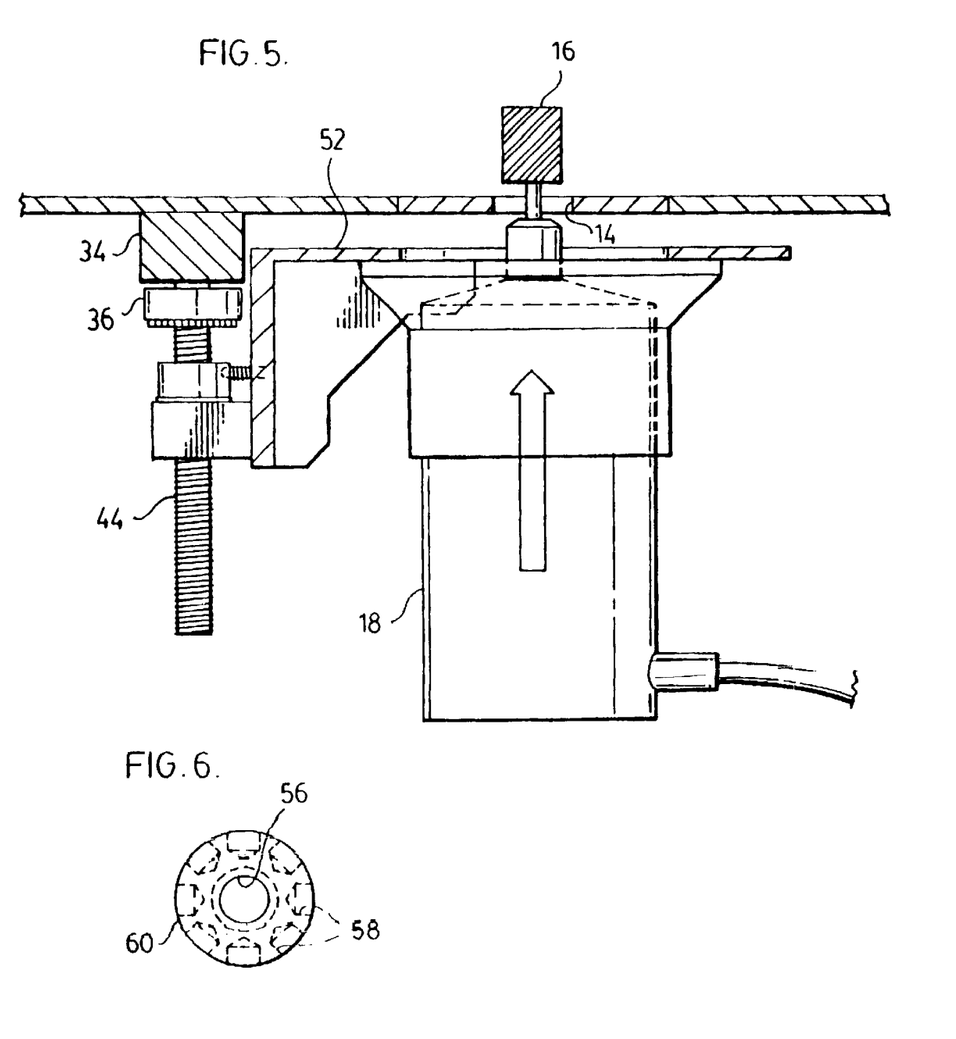
FIG. 5 is an elevation of the apparatus showing the manner in which it raises a router.
FIG. 6 is a top view of a collar of the apparatus.

With reference to FIGS. 2, 4 and 6, a collar 54 has a threaded central opening 56 through which the spindle extends. A number of radially extending threaded openings 58 are formed on outer wall 60 of the collar. Each opening is adapted to receive the end of screw 62 which extends through a threaded opening in the vertical wall. The purpose of the collar is described below.

Resilient means in the form of a coil spring or a rubber washer 64 is interposed between the collar and the threaded block 46.

A pair of vertical guide rods 70, 72 is affixed to bar 30 and extend downwardly from it. The bars are slidingly received in elongated cylindrical openings formed in a pair of sleeves 74, 76. The sleeves are affixed to vertical wall 50. The rods and sleeves cooperate to guide the carriage as it moves upwardly and downwardly relative to plate 12.

Figure 8:
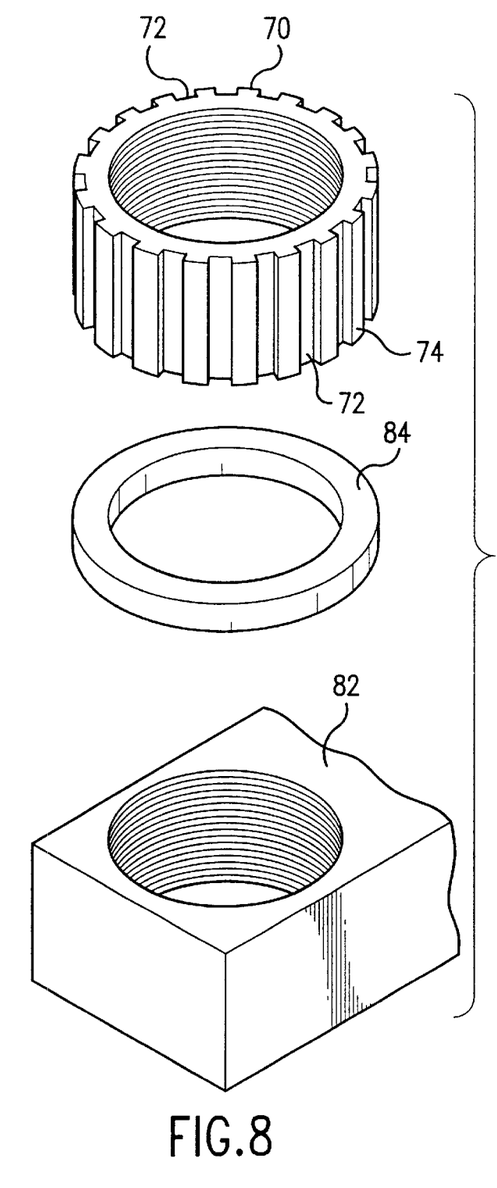
FIG. 8 is a perspective view of a second embodiment of the collar in conjunction with a washer and a block.
Figure 9:
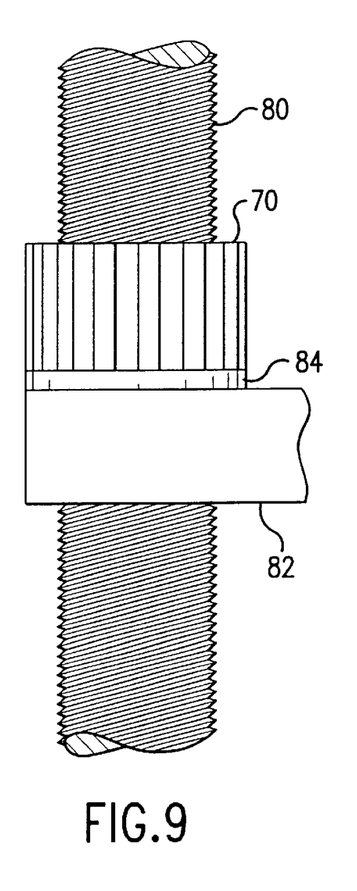
FIG. 9 is an elevation of the components of FIG. 8 shown connected to a spindle.

With reference to FIGS. 8 and 9, collar 70 has a toothed outer wall formed by a plurality of longitudinally extending parallel grooves 72 arrayed along the entire outer wall. The grooves are spaced apart by ribs 74. The collar has threads 76 formed on its inner wall and those threads mate with threads 78 formed on the outer wall of spindle 80.

Figure 10:
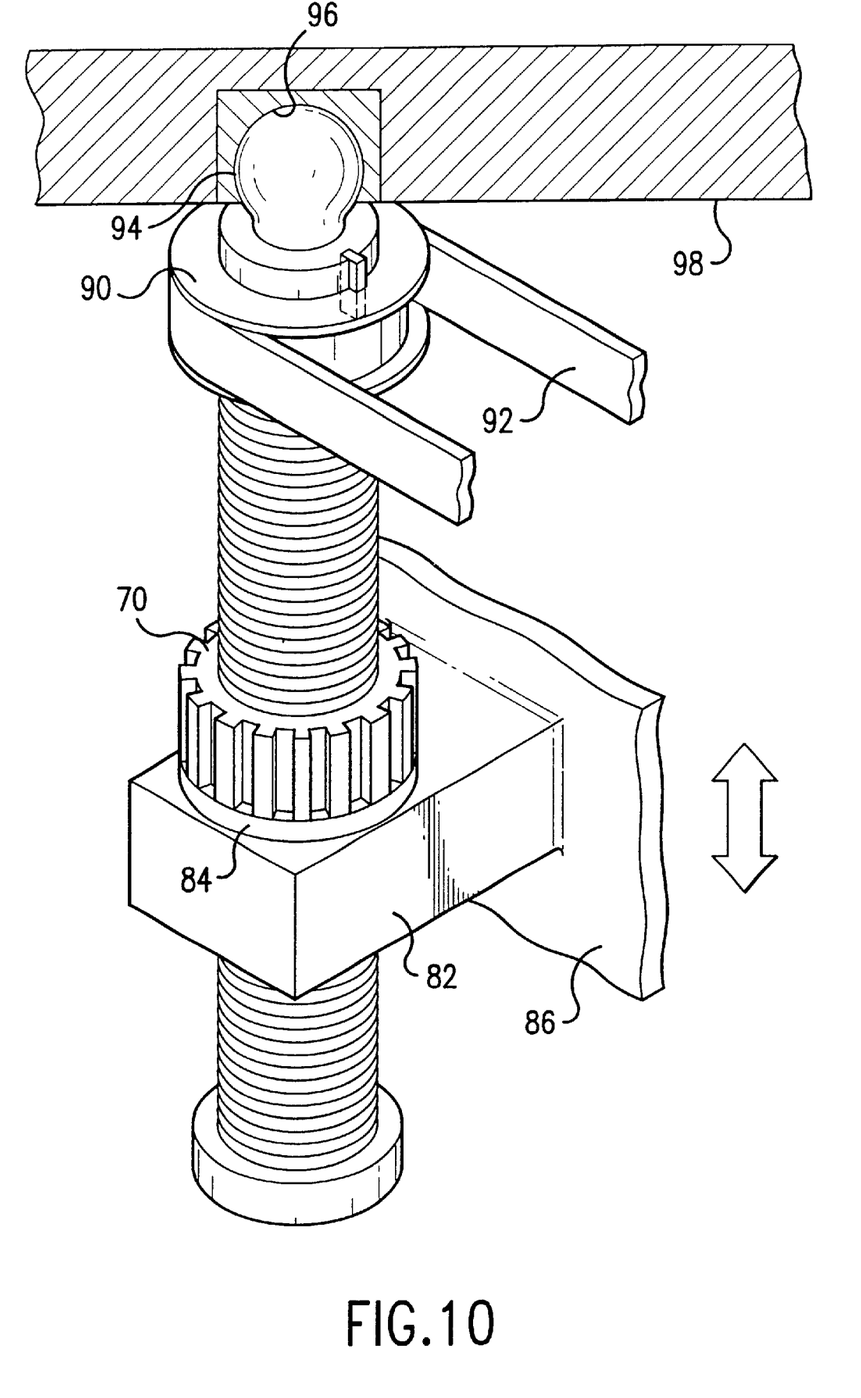
FIG. 10 is a perspective view of the components of FIG. 9 in conjunction with the apparatus for causing the spindle to rotate.

With reference to FIG. 10, collar 70 is disposed on the spindle above block 82 and a resilient washer 84 separates the collar from the block. The block is attached to the vertical wall 86 of the carriage in the same way as block 46 illustrated in the previous drawings is attached to the carriage.

A sheave 90 is splined to the spindle and a belt 92 is trained around the groove in the sleeve. The sheave and belt serve the same function as gear wheel 40 and belt 42 illustrated in FIGS. 1–3.

A ball 94 is affixed to the upper end of the spindle and the ball is received in a socket 96 formed in bar 98 beneath the working surface of the assembly.

Figure 7:
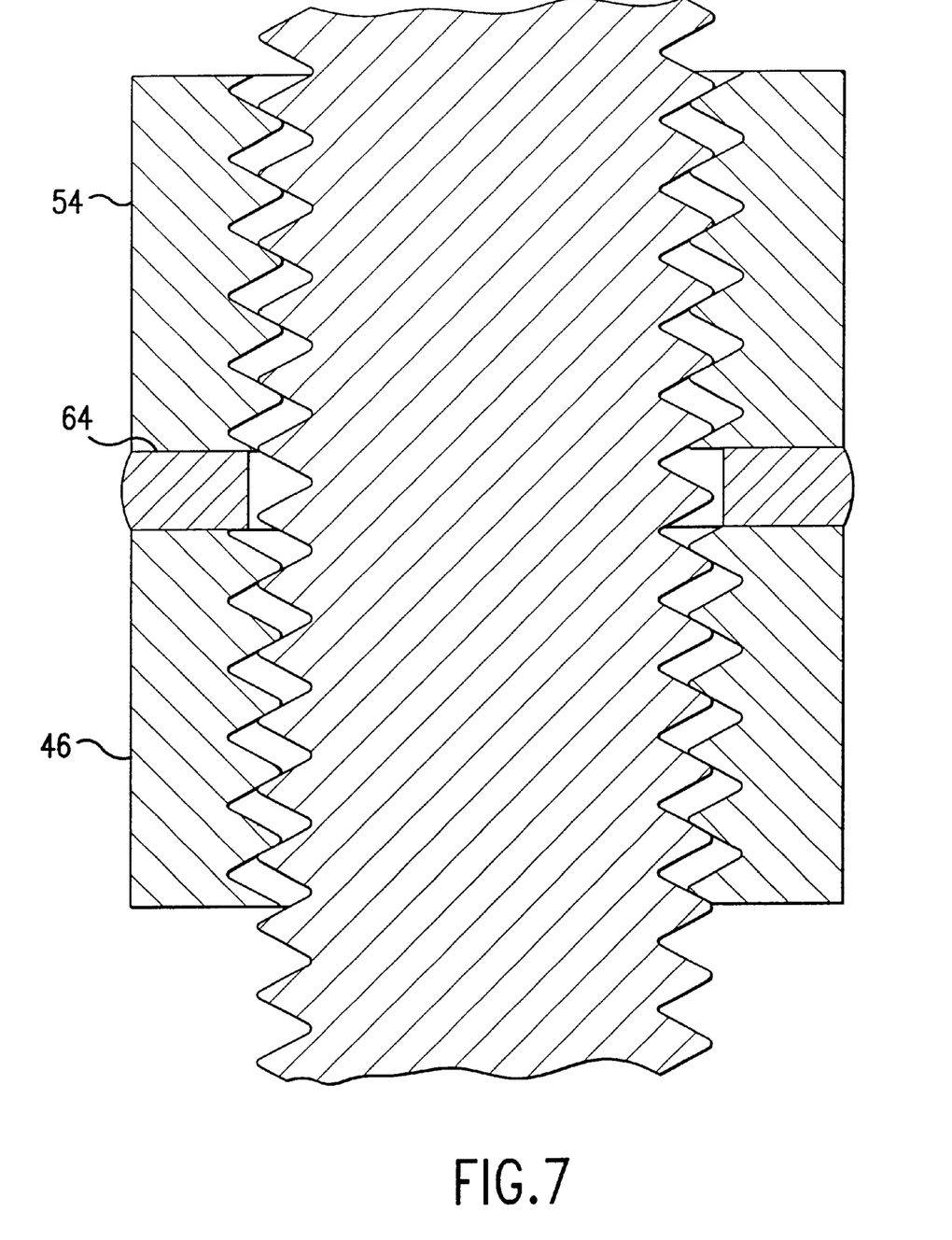
FIG. 7 is an enlarged elevation of the collar in conjunction with a spindle and block of the apparatus.

The operation of the level-adjusting apparatus is described with reference to FIGS. 4, 5 and 7. With reference first to FIG. 4, rotation of handle 24 causes a like rotation of tube 34 within which stem 22 is located. As tube 34 rotates so too does gear wheel 36. The latter wheel drives gear wheel 40 which in turn causes spindle 44 to rotate. The spindle causes block 46 to move vertically downward with resulting like movement of the carriage 52 to which router 18 is attached. Guide rods 70, 72 ensure that the movement of the carriage is linear and not rotary.

As the router descends, bit 16 withdraws from aperture 14. FIG. 5 shows the effect of rotation of the handle in the opposite direction.

Should there be slippage between the spindle and block 46, screw 62 is disengaged from the collar 54 and the collar is rotated to advance it toward block 46. Such advance will compress the spring or washer 64 which in turn will apply an opposite or counter upward pressure against the collar. Such pressure will force the threads of the collar against the threads of the spindle as illustrated in FIG. 7 and friction between the two will prevent further slippage. Screw 62 is then tightened into whichever opening 58 in the collar faces the screw to lock the collar in this position and to prevent it from further rotation.

With reference to FIGS. 8–10, the operation of collar 70 is the same as that of collar 54. The collar is prevented from rotating by means for a screw similar to screw 62 of FIG. 4. The forward end of the screw fits into any one of grooves 72 and when therein prevents the collar from turning.

As indicated previously, the spring or washer resiliently biases the collar upward when it is tightened against the spring or washer. Such pressure takes up any clearance between the threads of the spindle and the collar and prevents any vertical play between the two components. Such pressure also prevents the spindle from rotating.

The collar thus serves to lock the carriage in position and prevents upward or downward movement of the carriage on which the router is mounted. Screw 62 serves as stop means to prevent the collar from rotating on the spindle once it is in the desired position.

While the drawings show a router connected to the level-adjusting apparatus of the invention it will be understood that other tools such as a power saw may also be connected to the carriage with useful results.

It will also be understood that other modifications can be made in the preferred embodiments illustrated and described herein without departing from the scope and purview of the invention as described herein.

I claim:

1. A level-adjusting apparatus for adjusting the level of a tool implement for cutting a piece of work on a working surface on which the work to be cut is placed, said level adjusting apparatus comprising:

a carriage mounted beneath said working surface and adapted to support said tool implement such that said cutting implement projects through and above said working surface, said carriage being separate and apart from said tool implement and having means for removable attachment thereof to said tool implement; means for altering the level of said carriage; and handle means comprising a rotatable stem which is removably mounted to and extending upwardly from said working surface and operatively connected to and activating said altering means, wherein said altering means include a spindle threadably mounted to said carriage, wherein the spindle and said tool implment are axially spaced from each other, said rotatable stem being mounted for rotation and being operatively connected to said spindle for causing said spindle to rotate with resulting alteration in the level of said carriage;

wherein said spindle has threads which mate with threads formed in said carriage, and said apparatus further having means for tightening the threads of said spindle to the threads of said carriage to prevent slippage between the threads of said spindle and the threads of said carriage throughout the length of travel of said carriage.

2. The level-adjusting apparatus as claimed in claim 1 further including a rotary element mounted for rotation beneath said working surface and operatively connected to said spindle, said rotary element having a space defined by an inner wall, said space communicating with an aperture formed in said working surface, said handle means having a rotatable stem receivable in said space and in mating relationship with said inner wall and, when said stem is rotated, said rotary element is rotated with resulting alteration in the level of said carriage.

3. The level-adjusting apparatus as claimed in claim 1 wherein said altering means is separated from said space such that any debris which is generated by cutting of said work space on said working surface and which falls downwardly into said aperture falls through said space and exits downwardly of said rotary element without contacting said altering means.

4. The level-adjusting apparatus as claimed in claim 2 further including a first wheel mounted to said rotary element, a second gear wheel mounted to said spindle, said gear wheels being laterally spaced from each other and operatively interconnected.

5. The level-adjusting apparatus as claimed in claim 2 further including a first wheel mounted to said rotary element, a second wheel mounted to said spindle, said gear wheels being laterally spaced from each other and operatively interconnected such that any debris which is generated by cutting of said work piece on said working surface and which falls downwardly into said aperture falls through said space and exits downwardly of said rotary element without contacting said spindle.

6. The level-adjusting apparatus as claimed in claim 1 further including a collar threadably connected to said spindle; said resilient means disposed between said collar and said carriage.

7. The level-adjusting apparatus as claimed in claim 1 further including a collar having threads which mate with threads of said spindle; resilient means disposed between said collar and said carriage; said collar upon rotation in one direction advancing toward said carriage and applying pressure to said resilient means with resulting counter pressure being applied to said carriage by said resilient means such that the threads of said collar move into contact with the threads of said spindle and frictionally resist slippage between the threads of said spindle and said carriage.

8. The level-adjusting apparatus as claimed in claim 7 further including stop means for preventing said collar from rotating on said spindle, said collar having an outer wall having a plurality of longitudinally extending grooves formed therein, said stop means being removably disposed in any one of said grooves and when therein preventing said collar from rotating on said spindle.

9. The level-adjusting apparatus as claimed in claim 7 further including stop means for preventing said collar from rotating on said spindle, said collar having an outer wall in which a plurality of radially extending threaded openings are formed, said stop means being removably received in any one of said openings and when therein preventing said collar from rotating on said spindle.

10. The level-adjusting apparatus as claimed in claim 1 further including means for removably interconnecting said collar to said carriage to prevent rotation of said collar on said spindle.

11. The level-adjusting apparatus as claimed in claim 1, wherein said rotatable stem is removably mounted to said working surface at a point laterally displaced from said spindle.

12. A level-adjusting apparatus for adjusting the level of a router having a bit for cutting a piece of work on a working surface on which the work to be cut is placed, said level adjusting apparatus comprising:

a carriage mounted beneath said working surface and adapted to support said router such that said bit projects through and above said working surface, said carriage being separate and apart from said router and having means for removable attachment thereof to said router; means for altering the level of said carriage; and handle means comprising a rotatable stem which is operatively and removably connected to and extending upwardly from said working surface and activating said altering means, wherein said altering means include a spindle threadably mounted to said carriage, said rotatable stem being mounted for rotation and being operatively connected to said spindle for causing said spindle to rotate with resulting alteration in the level of said carriage, wherein said spindle and said router are axially spaced from each other, wherein said spindle and has threads which mate with threads formed in said carriage, said apparatus further having means for tightening the threads of said spindle to the threads of said carriage to prevent slippage between the threads of said spindle and the threads of said carriage throughout the length of travel of said carriage.

13. The level-adjusting apparatus as claimed in claim 12 wherein said altering means includes a spindle threadably mounted to said carriage and a rotary element mounted for rotation beneath said working surface, said element having a vertically extending space defined by an inner wall, said space communicating with an aperture formed in said working surface, said spindle being operatively connected to said rotary element such that rotation of said rotary element causes said spindle to rotate with resulting alteration in the level of said carriage.

14. The level-adjusting apparatus as claimed in claim 13 wherein said handle means comprises a rotatable stem removably received in said aperture and in mating relationship with said inner wall of said space such that rotation of said stem causes a like rotation of said rotary element.

15. The level-adjusting apparatus as claimed in claim 13, wherein said rotatable stem is removably mounted to said working surface at a point laterally displaced from said spindle.

16. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface; means for altering the level of said carriage; and handle means comprising a rotatable stem which is removably mounted to and extending upwardly from said working surface, said altering means including a spindle threadably mounted to said carriage, a rotary element mounted for rotation beneath said working surface and operatively connected to said spindle and said rotatable stem of said handle means, and which, when said stem is rotated, causes a like rotation of said rotary element with resulting alteration in the level of said carriage, and further including a first great wheel mounted to said rotary element, a second gear wheel mounted to said spindle, and said gear wheels being laterally spaced from each other and operatively interconnected.

17. The level-adjusting apparatus as claimed in claim 16, wherein said rotary element has a space defined by an inner wall, which space communications with an aperture formed in said working surface, and said stem removably receivable in said space in mating relationship with said inner wall.

18. The level-adjusting apparatus as claimed in claim 16, wherein said spindle has threads which mate with threads formed in said carriage, said apparatus further having means for preventing slippage between the threads of said spindle and the threads of said carriage throughout the length of travel of said carriage.

19. The level-adjusting apparatus as claimed in claim 16, wherein said spindle has threads which mate with threads formed in said carriage, said apparatus further including a collar threadably connected to said spindle, and resilient means disposed between said collar and said carriage.

20. The level-adjusting apparatus as claimed in claim 16, wherein said spindle has threads which mate with threads of said carriage, said apparatus further including a collar having threads which mate with the threads of said spindle, resilient means disposed between said collar and said carriage, said collar upon rotation in one direction advancing toward said carriage and applying pressure to said resilient means with resulting counter pressure being applied to said spindle by said resilient means such that the threads of said collar move into contact with the threads of said spindle and frictionally resist slippage between the threads of said spindle and said carriage.

21. The level-adjusting apparatus as claimed in claim 20, further including stop means for preventing said collar from rotating on said spindle, said collar having an outer wall having a plurality of longitudinally extending grooves formed therein, said stop means being removably disposed in any one of said grooves and when therein preventing said collar from rotating on said spindle.

22. The level-adjusting apparatus as claimed in claim 20, further including stop means for preventing said collar from rotating on said spindle, said collar having an outer wall in which a plurality of radially extending openings are formed, said stop means being removably disposed in any one of said openings and when therein preventing said collar from rotating on said spindle.

23. The level-adjusting apparatus as claimed in claim 18, further including means for removably interconnecting said collar to said carriage to prevent rotation of said collar on said spindle.

24. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface; means for altering the level of said carriage comprising a spindle threadably mounted to said carriage; and handle means removably mounted to and extending upwardly from said working surface and operatively connected to said spindle for causing said spindle to rotate stem which is removably mounted to said working surface at a point laterally displaced from said spindle.

25. The level-adjusting apparatus as claimed in claim 24, wherein said carriage is separate and apart from said tool and having means for removable attachment to said tool.

26. The level-adjusting apparatus as claimed in claim 24, wherein said tool is a router.

27. The level-adjusting apparatus as claimed in claim 25, wherein said tool is a router.

28. The level-adjusting apparatus as claimed in claim 24, wherein said altering means further a rotary element mounted for rotation beneath said working surface and operatively connected to said spindle and said rotatable stem, and which, when said stem is rotated, causes a like rotation of said rotary element with resulting alteration in the level of said carriage.

29. The level-adjusting apparatus as claimed in claim 28, wherein said rotary element has a space defined by an inner wall, which space communicating with an aperture formed in said working surface, said stem removably receivable in mating relationship with said inner wall.

30. The level-adjusting apparatus as claimed in claim 24, further including a first gear wheel mounted to said rotary element, a second gear wheel mounted to said spindle, said gear wheels being laterally spaced from each other and operatively interconnected.

31. The level-adjusting apparatus as claimed in claim 24, wherein said spindle has threads which mate with threads formed in said carriage, said apparatus further having means for preventing slippage between the threads of said spindle and the threads of said carriage.

32. The level-adjusting apparatus as claimed in claim 24, wherein said spindle has threads which mate with threads formed in said carriage, said apparatus further including a collar threadably connected to said spindle, and resilient means disposed between said collar and said carriage.

33. The level-adjusting apparatus as claimed in claim 24, wherein said spindle has threads which mate with threads of said carriage, said apparatus further including a collar having threads which mate with the threads of said spindle, resilient means disposed between said collar and said carriage, said collar upon rotation in one direction advancing toward said carriage and applying pressure to said resilient means with resulting counter pressure being applied to said spindle by said resilient means such that the threads of said collar move into contact with the threads of said spindle and frictionally resist slippage between the threads of said spindle and said carriage.

34. The level-adjusting apparatus as claimed in claim 32, further including stop means for preventing said collar from rotating on said spindle, said collar having an outer wall having a plurality of longitudinally extending grooves formed therein, said stop means being removably disposed in any one of said grooves and when therein preventing said collar from rotating on said spindle.

35. The level-adjusting apparatus as claimed in claim 32, further including stop means for preventing said collar from rotating on said spindle, said collar having an outer wall in which a plurality of radially extending openings are formed, said stop means being removably disposed in any one of said openings and when therein preventing said collar from rotating on said spindle.

36. The level-adjusting apparatus as claimed in claim 32, further including means for removably interconnecting said collar to said carriage to prevent rotation of said collar on said spindle.

37. The level-adjusting tool as claimed in claim 16, wherein said tool is a router having a bit for cutting a piece of work on said working surface.

38. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface, said carriage being separate and apart from said tool and having means for removable attachment thereof to said tool;

means for altering the level of said carriage;

handle means removably mounted to and extending upwardly from said working surface and operatively connected to and activating said altering means, a rotary element mounted for rotation beneath said working surface, said element having a vertically extending space defined by an inner wall, said space communicating with an aperture formed in said working surface, said altering means being operatively connected to said rotary element such that rotation of said rotary element causes said altering means to adjust the level of said carriage, said handle having a rotatable stem removably received in said aperture and said space and when therein said handle means is above said working surface and said stem contacts said inner wall such that rotation of said handle causes a like rotation of said rotary element, wherein said altering means is separated laterally from said vertically extending space such that any debris which is generated by cutting of said work piece on said working surface and which falls downwardly into said aperture falls through said space and exits downwardly of said rotary element without contacting said altering means.

39. The level-adjusting tool as claimed in claim 38, wherein said tool is a router having a bit for cutting a piece of work on said working surface.

40. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface, said carriage being separate and apart from said tool and having means for removable attachment thereof to said tool;

handle means removably mounted to and extending upwardly from said working surface and operatively connected to and activating said altering means, means for altering the level of said carriage including a spindle threadably mounted to said carriage, said handle means being mounted for rotation and being operatively connected to said spindle for causing said spindle to rotate with resulting alteration in the level of said carriage;

wherein said spindle has threads which mate with threads formed in said carriage, said apparatus further including a collar having threads which mate with the threads of said spindle, resilient means disposed between said collar and said carriage, said collar upon rotation in one direction advancing toward said carriage and applying pressure to said resilient means with resulting counter pressure being applied to said carriage by said resilient means such that the threads of said collar move into contact with the threads of said spindle and frictionally resist slippage between the threads of said spindle and said carriage throughout the length of travel of said carriage, stops means for preventing said collar from rotating on said spindle, said collar having an outer wall having a plurality of longitudinally extending grooves formed therein, said stop means being removably disposed in any one of said grooves and when therein preventing said collar from rotating on said spindle.

41. The level-adjusting tool as claimed in claim 40, wherein said tool is a router having a bit for cutting a piece of work on said working surface.

42. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface, said carriage being separate and apart from said tool and having means for removable attachment thereof to said tool;

handle means removably mounted to and extending upwardly from said working surface and operatively connected to and activating said altering means, means for altering the level of said carriage including a spindle threadably mounted to said carriage, said handle means being mounted for rotation and being operatively connected to said spindle for causing said spindle to rotate with resulting alteration in the level of said carriage;

wherein said spindle has threads which mate with threads formed in said carriage, said apparatus further including a collar having threads which mate with the threads of said spindle, resilient means disposed between said collar and said carriage, said collar upon rotation in one direction advancing toward said carriage and applying pressure to said resilient means with resulting counter pressure being applied to said carriage by said resilient means such that the threads of said collar move into contact with the threads of said spindle and frictionally resist slippage between the threads of said spindle and said carriage, stop means for preventing said collar from rotating on said spindle, said collar having an outer wall in which a plurality of radially extending threaded openings are formed, said stop means being removably received in any one of said openings and when therein preventing said collar from rotating on said spindle.

43. The level-adjusting tool as claimed in claim 42, wherein said tool is a router having a bit for cutting a piece of work on said working surface.

44. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface; and handle means comprising a rotatable stem which is removably mounted to and extending upwardly from said working surface, means for altering the level of said carriage including a spindle threadably mounted to said carriage, a rotary element mounted for rotation beneath said working surface and operatively connected to said spindle and said rotatable stem of said handle means, and which, when said stem is rotated, causes a like rotation of said rotary element with resulting alteration in the level of said carriage, wherein said spindle has threads which mate with threads formed in said carriage, said apparatus further including a collar having threads which mate with the threads of said spindle, resilient means disposed between said collar and said carriage, said collar upon rotation in one direction advancing toward said carriage and applying pressure to said resilient means with resulting counter pressure being applied to said carriage by said resilient means such that the threads of said collar move into contact with the threads of said spindle and frictionally resist slippage between the threads of said spindle and said carriage, stop means for preventing said collar from rotating on said spindle, said collar having an outer wall having a plurality of longitudinally extending grooves formed therein, said stop means being removably disposed in any one of said grooves and when therein preventing said collar from rotating on said spindle.

45. The level-adjusting tool as claimed in claim 44, wherein said tool is a router having a bit for cutting a piece of work on said working surface.

46. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface;

means for altering the level of said carriage comprising a spindle threadably mounted to said carriage;

handle means removably mounted to and extending upwardly from said working surface and operatively connected to said spindle for causing said spindle to rotate with resulting alteration in the level of said carriage; said handle means comprising a rotatable stem which is removably mounted to said working surface at a point laterally displaced from said spindle, first gear wheel mounted to said rotary element, a second gear wheel mounted to said spindle, said gear wheels being laterally spaced from each other and operatively interconnected.

47. The level-adjusting tool as claimed in claim 46, wherein said tool is a router having a bit for cutting a piece of work on said working surface.

48. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface;

means for altering the level of said carriage comprising a spindle threadably mounted to said carriage;

handle means removably mounted to and extending upwardly from said working surface and operatively connected to said spindle for causing said spindle to rotate with resulting alteration in the level of said carriage; said handle means comprising a rotatable stem which is removably mounted to said working surface at a point laterally displaced from said spindle, wherein said spindle has threads which mate with threads formed in said carriage, said apparatus further including a collar threadably connected to said spindle, and resilient means disposed between said collar and said carriage, stop means for preventing said collar from rotating on said spindle, said collar having an outer wall having a plurality of longitudinally extending grooves formed therein, said stop means being removably disposed in any one of said grooves and when therein preventing said collar from rotating on said spindle.

49. The level-adjusting tool as claimed in claim 48, wherein said tool is a router having a bit for cutting a piece of work on said working surface.

50. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface;

means for altering the level of said carriage comprising a spindle threadably mounted to said carriage;

handle means removably mounted to and extending upwardly from said working surface and operatively connected to said spindle for causing said spindle to rotate with resulting alteration in the level of said carriage, said handle means comprising a rotatable stem which is removably mounted to said working surface at a point laterally displaced from said spindle, wherein said spindle has threads which mate with threads formed in said carriage, said apparatus further including a collar threadably connected to said spindle, and resilient means disposed between said collar and said carriage, stop means for preventing said collar from rotating on said spindle, said collar having an outer wall in which a plurality of radially extending openings are formed, said stop means being removably disposed in any one of said openings and when therein preventing said collar from rotating on said spindle.

51. The level-adjusting tool as claimed in claim 50, wherein said tool is a router having a bit for cutting a piece of work on said working surface.

52. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface, said carriage being separate and apart from said tool and having means for removable attachment thereof to said tool;

means for altering the level of said carriage including a spindle threadably mounted to said carriage, handle means removably mounted to and extending upwardly from said working surface and operatively connected to and activating said altering means, a rotary element mounted for rotation beneath said working surface and operatively connected to said spindle, said rotary element having a space defined by an inner wall, said space communicating with an aperture formed in said working surface, said handle means having a rotatable stem receivable in said space and in mating relationship with said inner wall and, when said stem is rotated, said rotary element is rotated with resulting alteration in the level of said carriage, first gear wheel mounted to said rotary element, a second gear wheel mounted to said spindle, said gear wheels being laterally spaced from each other and operatively interconnected.

53. The level-adjusting tool as claimed in claim 52, wherein said tool is a router having a bit for cutting a piece of work on said working surface.

54. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface, said carriage being separate and apart from said tool and having means for removable attachment thereof to said tool;

means for altering the level of said carriage including a spindle threadably mounted to said carriage;

handle means removably mounted to and extending upwardly from said working surface and operatively connected to and activating said altering means, a rotary element mounted for rotation beneath said working surface and operatively connected to said spindle, said rotary element having a space defined by an inner wall, said space communicating with an aperture formed in said working surface, said handle means having a rotatable stem receivable in said space and in mating relationship with said inner wall and, when said stem is rotated, said rotary element is rotated with resulting alteration in the level of said carriage, a first gear wheel mounted to said rotary element, a second gear wheel mounted to said spindle, said gear wheels being laterally spaced from each other and operatively interconnected such that any debris which is generated by cutting of said work piece on said working surface and which falls downwardly into said aperture falls through said space and exits downwardly of said rotary element without contacting said spindle.

55. The level-adjusting tool as claimed in claim 54, wherein said tool is a router having a bit for cutting a piece of work on said working surface.

56. A level-adjusting apparatus for adjusting the level of a tool having an implement for cutting a piece of work on a working surface on which the work to be cut is placed, said level adjusting apparatus comprising:

a carriage mounted beneath said working surface and adapted to support said tool such that said cutting implement projects through and above said working surface;

handle means comprising a rotatable stem which is removably mounted to and extending upwardly from said working surface, means for altering the level of said carriage including a spindle threadably mounted to said carriage, a rotary element mounted for rotation beneath said working surface and operatively connected to said spindle and said rotatable stem of said handle means, and which, when said stem is rotated, causes a like rotation of said rotary element with resulting alteration in the level of said carriage, wherein said spindle has threads which mate with threads formed in said carriage, said apparatus further including a collar threadably which mate with the threads of said spindle, resilient means disposed between said collar and said carriage, said collar upon rotation in one direction advancing toward said carriage and applying pressure to said resilient means with resulting counter pressure being applied to said carriage by said resilient means such that the threads of said collar move into contact with the threads of said spindle and frictionally resist spillage between threads of said spindle and said carriage, stop means for preventing said collar from rotating on said spindle, said collar having an outer wall having a plurality of radially extending openings are formed, said stop means being removably received in any one of said openings and when therein preventing said collar from rotating on said spindle.

57. The level-adjusting tool as claimed in claim 56, wherein said tool is a router having a bit for cutting a piece of work on said working surface.

* * * * *